(12) United States Patent
Yamauchi et al.

(10) Patent No.: US 8,668,987 B2
(45) Date of Patent: Mar. 11, 2014

(54) ELECTROPHOTOGRAPHIC ELECTRICALLY CONDUCTIVE MEMBER

(75) Inventors: Kazuhiro Yamauchi, Suntou-gun (JP); Norifumi Muranaka, Yokohama (JP); Satoru Nishioka, Suntou-gun (JP); Yuichi Kikuchi, Susono (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 13/532,770

(22) Filed: Jun. 25, 2012

(65) Prior Publication Data

US 2012/0263499 A1    Oct. 18, 2012

Related U.S. Application Data

(63) Continuation of application No. PCT/JP2012/001851, filed on Mar. 16, 2012.

(30) Foreign Application Priority Data

Mar. 22, 2011  (JP) .................................. 2011-062717
Mar. 8, 2012   (JP) .................................. 2012-051718

(51) Int. Cl.
*G03G 15/02* (2006.01)

(52) U.S. Cl.
USPC ........................ 428/411.1; 399/168; 399/176

(58) Field of Classification Search
None
See application file for complete search history.

(56) References Cited

U.S. PATENT DOCUMENTS

| | | | |
|---|---|---|---|
| 7,941,077 B2 | 5/2011 | Oshima et al. | |
| 7,947,339 B2 | 5/2011 | Yamauchi et al. | |
| 2012/0020700 A1 | 1/2012 | Yamada et al. | |
| 2012/0027456 A1 | 2/2012 | Muranaka et al. | |
| 2012/0070188 A1 | 3/2012 | Hirakoso et al. | |
| 2012/0251171 A1 | 10/2012 | Muranaka et al. | |

FOREIGN PATENT DOCUMENTS

| | | | |
|---|---|---|---|
| JP | 1-142569 A | 6/1989 | |
| JP | 2001-74033 A | 3/2001 | |
| JP | 2001-74034 A | 3/2001 | |
| JP | 2002-132014 A | 5/2002 | |
| JP | 2003-202722 A | 7/2003 | |
| JP | 2005120158 A | * 5/2005 | |
| JP | 2005-350621 A | 12/2005 | |
| JP | 2007-138113 A | 6/2007 | |
| JP | 2008-224739 A | 9/2008 | |
| JP | 2010-8878 A | 1/2010 | |

OTHER PUBLICATIONS

Machine translation of JP 2005-120158A, May 2005.*
PCT International Search Report and Written Opinion of the International Searching Authority, International Application No. PCT/JP2012/001851, Mailing Date Apr. 10, 2012.
Kikuchi, et al., U.S. Appl. No. 13/551,554, filed Jul. 17, 2012.
Tsuru, et al., U.S. Appl. No. 13/572,303, filed Aug. 10, 2012.
PCT International Search Report dated Apr. 10, 2012 in International Application No. PCT/JP2012/001851.
PCT International Preliminary Report on Patentability, International Application No. PCT/JP2012/001851, Mailing Date Oct. 3, 2013.

* cited by examiner

*Primary Examiner* — Ramsey Zacharia
(74) *Attorney, Agent, or Firm* — Fitzpatrick, Cella, Harper and Scinto

(57) ABSTRACT

The present invention provides an electrophotographic electrically conductive member in which conductivity needed for a charging member is secured, and defects in an image attributed to uneven discharging can be minimized independently of a long-term use and an environment of use. An electrophotographic electrically conductive member comprising an electrically conductive support and an electrically conductive layer, wherein the electrically conductive layer includes an ion conductive resin having a quaternary ammonium ion in a molecule structure as a binder resin, and a carrier molecule represented by the following formula (1) or (2):
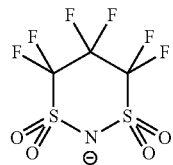
(1)
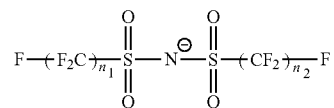
(2)
(wherein $n_1$ and $n_2$ each independently represent an integer of 1 to 4).
5 Claims, 4 Drawing Sheets

ELECTROPHOTOGRAPHIC ELECTRICALLY CONDUCTIVE MEMBER

CROSS-REFERENCE TO RELATED APPLICATIONS

This application is a continuation of International Application No. PCT/JP2012/001851, filed Mar. 16, 2012, which claims the benefit of Japanese Patent Application No. 2011-062717 filed Mar. 22, 2011 and Japanese Patent Application No. 2012-051718 filed Mar. 8, 2012.

BACKGROUND OF THE INVENTION

1. Field of the Invention

The present invention relates to an electrophotographic electrically conductive member used for electrophotographic apparatuses and process cartridges.

2. Description of the Related Art

In image forming apparatuses using an electrophotographic method, namely, electrophotographic apparatuses, electrically conductive members are used in various applications, i.e., as members such as a charging member, a developing member, and a transfer member. In the electrophotographic apparatus, a charging roller as a charging member is disposed in contact with an electrophotographic photosensitive member to charge the electrophotographic photosensitive member. The charging roller comprises an electrically conductive layer. In order to control conductivity of the electrically conductive layer, an electron conductive agent such as carbon black, or an ion conductive agent such as quaternary ammonium salt compounds is added to the electrically conductive layer. The ion conductive agent is more uniformly dispersed in a binder resin than the electron conductive agent. In Japanese Patent Application Laid-Open No. H01-142569, an ion conductive agent is selected as the conductive agent in order to reduce unevenness of electric resistance attributed to the conductive agent unevenly dispersed in a binder resin.

Japanese Patent Application Laid-Open No. 2003-202722 uses a hydrophobic ion liquid as an ion conductive agent to improve the increase in electric resistance under a low temperature and a low humidity.

SUMMARY OF THE INVENTION

A charging member having locally uneven electric resistance may cause a photosensitive member to be locally unevenly discharged, leading to white or black blotches or a stripped unevenness of a density produced in an electrophotographic image.

As described above, as the conductive agent contained in the electrically conductive layer, the ion conductive agent has advantages over the electrically conductive agent for suppressing the unevenness of electric resistance of the charging member. However, even if the charging roller includes an electrically conductive layer having conductivity given using the ion conductive agent, it may cause the defects above attributed to local unevenness of discharge in the electrophotographic image. Particularly, when the number of the electrophotographic image to be output is increased because of a long-term use of the apparatus or when an image is formed under a low temperature and low humidity environment, the defects produced in an image attributed to the local unevenness of the electric resistance of the charging member are more likely to be increased.

Further, the ion conductive agent may bleed to the surface of the charging roller, and it may adhere to the surface of the electrophotographic photosensitive member which is contacting with the charging roller.

The present invention is directed to providing an electrophotographic electrically conductive member in which conductivity needed for a charging roller can be secured, bleeding of an ion conductive agent can be suppressed, and defects in an image attributed to local unevenness of discharge can be reduced.

According to one aspect of the present invention, there is provided an electrophotographic electrically conductive member comprising an electrically conductive support and an electrically conductive layer, wherein the electrically conductive layer includes an ion conductive resin having a quaternary ammonium ion in a molecule structure as a binder resin, and a carrier molecule represented by a following formula (1) or (2):

(1)

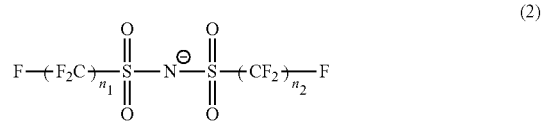

(2)

(wherein $n_1$ and $n_2$ each independently represent an integer of 1 to 4).

According to another aspect of the present invention, there is provided an electrophotographic electrically conductive member comprising an electrically conductive support and an electrically conductive layer, wherein the electrically conductive layer includes an ion conductive resin having a quaternary ammonium ion in a molecule structure as a binder resin, and a carrier molecule represented by a following formula (3) or (4):

$$PR_6^{\ominus} \qquad (3)$$

$$BF_4^{\ominus}. \qquad (4)$$

According to further aspect of the present invention, there is provided an electrophotographic electrically conductive member comprising an electrically conductive support and an electrically conductive layer, wherein the electrically conductive layer includes an ion conductive resin having a quaternary ammonium ion in a molecule structure as a binder resin, and a carrier molecule represented by a following formula (5):

(5)

(wherein $R_1$ represents a hydrocarbon group having 1 to 10 carbon atoms, and may include a heteroatom).

According to another aspect of the present invention, there is provided an electrophotographic electrically conductive member comprising an electrically conductive support and an electrically conductive layer, wherein the electrically conductive layer includes an ion conductive resin having a sulfonic acid ion in a molecule structure as a binder resin, and a carrier molecule represented by a following formula (6) or (7):

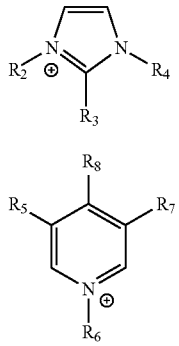

(6)

(7)

(wherein $R_2$, $R_3$, $R_4$, $R_5$, $R_6$, $R_7$, and $R_8$ each independently represent hydrogen or a hydrocarbon group having 1 to 10 carbon atoms, and may include a heteroatom).

According to another aspect of the present invention, there is provided an electrophotographic electrically conductive member comprising an electrically conductive support and an electrically conductive layer, wherein the electrically conductive layer includes an ion conductive resin having a sulfonic acid ion in a molecule structure as a binder resin, and a carrier molecule represented by a following formula (8) or (9):

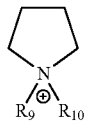

(8)

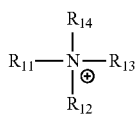

(9)

(wherein $R_9$, $R_{10}$, $R_{11}$, $R_{12}$, $R_{13}$, and $R_{14}$ each independently represent a hydrocarbon group having 1 to 10 carbon atoms, and may include a heteroatom).

According to further aspect of the present invention, there is provided an electrophotographic electrically conductive member comprising an electrically conductive support and an electrically conductive layer, wherein the electrically conductive layer includes an ion conductive resin having a sulfonic acid ion in a molecule structure as a binder resin, and a carrier molecule represented by a following formula (10):

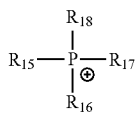

(10)

(wherein $R_{15}$, $R_{16}$, $R_{12}$, and $R_{18}$ each independently represent hydrogen or a hydrocarbon group having 1 to 10 carbon atoms, and may include a heteroatom).

The present invention provides an electrophotographic electrically conductive member in which bleeding of the ion conductive agent is suppressed, and defects in an image attributed to local unevenness of the electric resistance are difficult to produce.

Further features of the present invention will become apparent from the following description of exemplary embodiments with reference to the attached drawings.

DESCRIPTION OF THE EMBODIMENTS

Preferred embodiments of the present invention will now be described in detail in accordance with the accompanying drawings.

The present inventors presume the reason that the charging roller including an electrically conductive layer having conductivity given by an ion conductive agent causes locally uneven-discharge, as follows.

Namely, the carrier molecules derived from the ion conductive agent contained in the electrically conductive layer each have a different moving speed in the electrically conductive layer depending on the kinds of the carrier molecules.

Here, the moving speed of the carrier molecule can be expressed by a carrier mobility μ, and a relationship between carrier mobility μ and electrical resistivity ρ can be expressed by the following equation (1):

$$\frac{1}{\rho} = qn\mu \qquad \text{equation (1)}$$

wherein ρ represents electrical resistivity, q represents the charge of a carrier, n represents the density of the carrier, and μ represents carrier mobility. Apparently from the equation (1), it is expected that regions of the charging roller where carrier molecules having a small carrier mobility or carrier molecules having a large carrier mobility locally exist are concerned with the unevenness of electric resistance of the charging roller. Particularly, in the regions where the carrier molecules having a large carrier mobility locally exist, the electric resistance is locally reduced. For this reason, a white dot image is likely to be produced due to abnormal discharging.

Here, in order to reduce unevenness of the moving speed of the carrier molecule when DC voltage is applied to the charging roller, the present inventors attempted to reduce the moving speed of the carrier molecule moving in the electrically conductive layer. Specifically, the present inventors examined the effect of reducing the unevenness of electric resistance in the charging roller in the case where the carrier mobility of the carrier molecules existing in the electrically conductive layer is reduced.

As a result, it was found out that in the charging roller including the electrically conductive layer having conductivity given using an ion conductive agent including a carrier molecule having a small carrier mobility, unevenness of the electric resistance is hard to occur even if the DC voltage is continuously applied over a long time; as a result, the defects in an image attributed to unevenness of discharge can also be reduced.

In the electrically conductive member according to the present invention, the ion conductive agent is bonded to the binder resin by a covalent bond. For this reason, the component that contributes to ionic conduction can be limited to one of a cation and an anion. Further, because the ion conductive agent is bonded to the binder resin, bleeding of the ion conductive agent from the electrically conductive layer can be reduced as much as possible even if the DC voltage is applied to the charging roller over a long time.

Figure 1A:
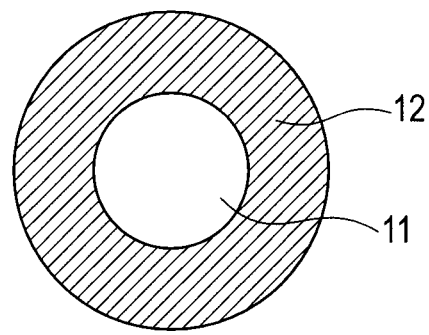
FIG. 1A is a schematic view of a charging roller as one embodiment of an electrophotographic electrically conductive member according to the present invention.
Figure 1B:
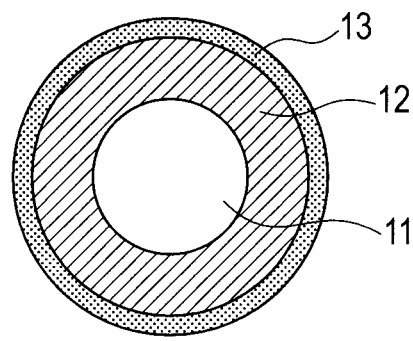
FIG. 1B is a schematic view of a charging roller as one embodiment of an electrophotographic electrically conductive member according to the present invention.
Figure 1C:
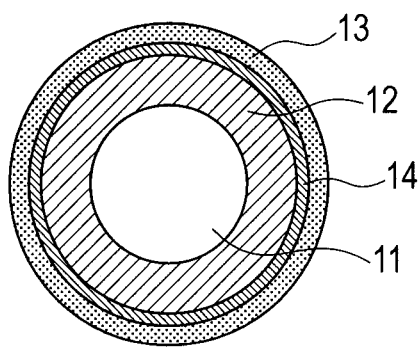
FIG. 1C is a schematic view of a charging roller as one embodiment of an electrophotographic electrically conductive member according to the present invention.

Hereinafter, the present invention will be described in detail. Hereinafter, as the electrophotographic electrically conductive member, a charging member will be described in detail. However, use of the present invention will not be limited only to the charging member. FIGS. 1A to 1C are schematic views of a charging member according to the present invention.

As illustrated in FIG. 1A, the charging member according to the present invention can include a core metal as an electrically conductive support, and an elastic layer 12 provided on the outer periphery thereof. The elastic layer 12 is an electrically conductive layer, and includes an ion conductive resin according to the present invention. As illustrated in FIG. 1B, a surface layer 13 may be formed on the surface of the elastic layer 12. In this case, at least one of the elastic layer 12 and the surface layer 13 is the electrically conductive layer, and includes the ion conductive resin according to the present invention. As illustrated in FIG. 1C, the charging member according to the present invention may have a three-layer structure in which an intermediate layer 14 is disposed between the elastic layer 12 and the surface layer 13, or a multi-layer structure in which a plurality of intermediate layers 14 are disposed. In this case, at least one of these layers is the electrically conductive layer, and the electrically conductive layer includes the ion conductive resin according to the present invention.

<Electrically Conductive Support>

An electrically conductive support can be properly selected from those known in the field of the electrophotographic electrically conductive member, and used.

<Electrically Conductive Layer>

Figure 3:
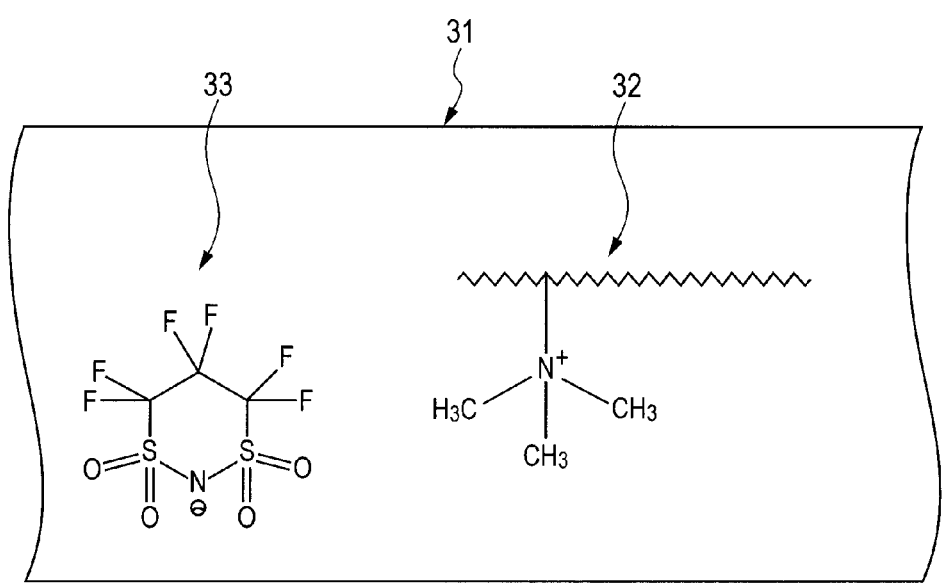
FIG. 3 is a schematic view of an electrically conductive layer according to the present invention.

The electrically conductive layer according to the present invention includes an ion conductive resin as a binder resin, the ion conductive resin having one or both of ion exchange groups selected from quaternary ammonium ions and sulfonic acid ions in the molecule structure. The electrically conductive layer according to the present invention also includes a specific carrier molecule. The ion exchange group according to the present invention is bonded to the resin by a covalent bond, and ion-dissociated. FIG. 3 is a schematic sectional view of one embodiment of the electrically conductive layer according to the present invention. An electrically conductive layer 31 includes an ion conductive resin 32 as the binder resin, in which quaternary ammonium ion as the ion exchange group is bonded to the polymer chain by a covalent bond. The electrically conductive layer 31 also includes a carrier molecule 33 represented by the formula (1) as a free carrier molecule.

(1) Carrier Molecule

The carrier molecule is originally the counter ion of the ion exchange group. It is thought that at least part of the carrier molecules is dissociated from the ion exchange group and exists free in the electrically conductive layer. By applying the DC voltage to the electrically conductive member, the free carrier molecules move in the binder resin to provide ionic conduction.

Then, as described above, use of the carrier molecule having a small carrier mobility can reduce unevenness of electric resistance in the charging member when the voltage is applied to the charging member over a long time. On the other hand, in giving conductivity to the electrically conductive layer, the carrier molecule having a small carrier mobility is relatively disadvantageous compared to the carrier molecule having a large carrier mobility. Accordingly, the present inventors repeatedly examined the carrier molecule that can provide a high level of compatibility between giving conductivity to the electrically conductive layer and reduction in the unevenness of electric resistance produced in the electrically conductive member. As a result, it was found that in the case where the binder resin has a quaternary ammonium ion within the molecule, electrically conductive layer preferably includes at least one selected from the carrier molecules represented by the following formulas (1) to (5). It was also found that in the case where the binder resin contains sulfonic acid ion within the molecule, the electrically conductive layer preferably includes at least one selected from the carrier molecules represented by the following formulas (6) to (10).

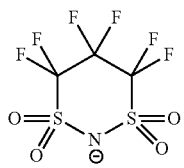
(1)

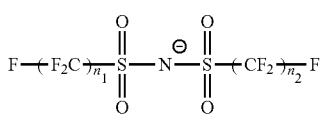
(2)

wherein $n_1$ and $n_2$ each independently represent an integer of 1 to 4.

(3)

(4)

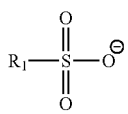
(5)

wherein $R_1$ represents a hydrocarbon group having 1 to 10 carbon atoms, and may include a heteroatom. Specific examples of the carrier molecule represented by the formula (5) include: methyl sulfonate, ethyl sulfonate, n-butyl sulfonate, sec-butyl sulfonate, tert-butyl sulfonate, n-hexyl sulfonate, n-octyl sulfonate, n-decyl sulfonate.

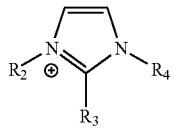
(6)

wherein $R_2$, $R_3$, and $R_4$ each independently represent hydrogen or a hydrocarbon group having 1 to 10 carbon atoms, and may include a heteroatom.

Specific examples of the compound represented by the formula (6) include: 1-methyl imidazolium, 1-ethyl imidazolium, 1-butyl imidazolium, 1-octyl imidazolium, 1-decyl imidazolium, 1,3-dimethyl imidazolium, 1-ethyl-3-methyl imidazolium, 1-propyl-3-methyl imidazolium, 1-butyl-3-methyl imidazolium, 1-hexyl-3-methyl imidazolium, 1-octyl-3 methyl imidazolium, 1-decyl-3-methyl imidazolium, 1,3-diethyl imidazolium, 1-propyl-3-ethyl imidazolium, 1-butyl-3-ethyl imidazolium, 1-hexyl-3-ethyl imidazolium, 1-octyl-3 ethyl imidazolium, 1-decyl-3-ethyl imidazolium, 1,2,3-trimethyl imidazolium, 1-ethyl-2,3-dimethyl imidazolium, 1-propyl-2,3-methyl imidazolium, 1-butyl-2,3-dimethyl imidazolium, 1-hexyl-2,3-dimethyl imidazolium, 1-octyl-2,3-dimethyl imidazolium, 1-decyl-2,3-dimethyl imidazolium, 1-butyl-3-ethyl imidazolium.

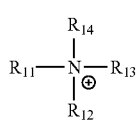
(7)

wherein $R_5$, $R_6$, $R_7$, and $R_8$ each independently represent hydrogen or a hydrocarbon group having 1 to 10 carbon atoms, and may include a heteroatom.

Specific examples of the compound represented by the formula (7) include: N-methylpyridinium, N-ethyl pyridinium, N-butyl pyridinium, N-hexyl pyridinium, N-octyl pyridinium, N-decyl pyridinium, N-methyl-3-methyl pyridinium, N-ethyl-3-methylpyridinium, N-butyl-3-methyl pyridinium, N-hexyl-3-methylpyridinium, N-octyl-3-methyl pyridinium, N-decyl-3-methylpyridinium, N-methyl-4-methyl pyridinium, N-ethyl-4-methylpyridinium, N-butyl-4-methyl pyridinium, N-hexyl-4-methylpyridinium, N-octyl-4-methyl pyridinium, N-decyl-4-methylpyridinium, N-methyl-3,4-dimethylpyridinium, N-ethyl-3,4-dimethylpyridinium, N-butyl-3,4-dimethylpyridinium, N-hexyl-3,4-dimethyl pyridinium, N-octyl-3,4-dimethylpyridinium, N-decyl-3,4-dimethylpyridinium, N-methyl-3,5-dimethylpyridinium, N-ethyl-3,5-dimethylpyridinium, N-butyl-3,5-dimethyl pyridinium, N-hexyl-3,5-dimethylpyridinium, N-octyl-3,5-dimethylpyridinium, N-decyl-3,5-dimethylpyridinium.

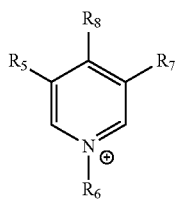
(8)

wherein $R_9$ and $R_{10}$ each independently represent hydrogen or a hydrocarbon group having 1 to 10 carbon atoms, and may include a heteroatom.

Specific examples of the compound represented by the formula (8) include: 1,1-dimethylpyrrolidinium, 1-ethyl-1-methylpyrrolidinium, 1-butyl-1-methyl pyrrolidinium, 1-hexyl-1-methylpyrrolidinium, 1-octyl-1-methylpyrrolidinium, 1-decyl-1-methylpyrrolidinium, 1,1-diethyl pyrrolidinium, 1-butyl-1-ethyl pyrrolidinium, 1-hexyl-1-ethyl pyrrolidinium, 1-octyl-1-ethyl pyrrolidinium, 1-decyl-1-ethyl pyrrolidinium, 1,1-dibutyl pyrrolidinium.

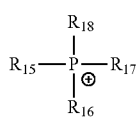
(9)

wherein $R_{11}$, $R_{12}$, $R_{13}$, and $R_{14}$ each independently represent hydrocarbon group having 1 to 10 carbon atoms, and may include a heteroatom.

Specific examples of the compound represented by the formula (9) include: tetramethyl ammonium, tetraethyl ammonium, tetrabutyl ammonium, tetrapentyl ammonium, tetrahexyl ammonium, tetraoctyl ammonium, tetradecyl ammonium, methyl triethyl ammonium, methyl tributyl ammonium, methyl trioctyl ammonium, methyl tridecyl ammonium, ethyl trimethyl ammonium, butyl trimethyl ammonium, hexyl trimethyl ammonium, octyl trimethyl ammonium, decyl trimethyl ammonium, phenyltrimethylammonium, cyclohexyl trimethyl ammonium, diallyl dimethyl ammonium, (2-chloroethyl)trimethyl ammonium, (2-hydroxyethyl)trimethyl ammonium.

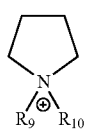
(10)

wherein $R_{15}$, $R_{16}$, $R_{17}$, and $R_{18}$ each independently represent hydrocarbon group having 1 to 10 carbon atoms, and may include a heteroatom.

Specific examples of the compound represented by the formula (10) include: tetramethyl phosphonium, tetraethyl phosphonium, tetrabutyl phosphonium, tetrapentyl phosphonium, tetrahexyl phosphonium, tetraoctyl phosphonium, tetradecyl phosphonium, methyl triethyl phosphonium, methyl tributyl phosphonium, methyl trioctyl phosphonium, methyl tridecyl phosphonium, ethyl trimethyl phosphonium, butyl trimethyl phosphonium, hexyl trimethyl phosphonium, octyl trimethyl phosphonium, decyl trimethyl phosphonium, phenyl trimethyl phosphonium, cyclohexyl trimethyl phosphonium, (2-chloroethyl)trimethyl phosphonium, (2-hydroxyethyl)trimethyl phosphonium.

Several kinds of the carrier molecules may be used.

The molecule size of the carrier molecule having a structure represented by the formulas (1) to (10) is extremely larger than that of an ordinary carrier molecule such as a proton and halogen ions. For this reason, it is thought that the carrier molecule having a structure represented by the formulas (1) to (10) has a small ion mobility $\mu$ to achieve the object of the present invention.

For example, when $R_{11}$ to $R_{14}$ are a hydrocarbon group having not less than 11 carbon atoms in the carrier molecule represented by the formula (9), it was found that the electric resistance of the charging member tends to be increased when the DC voltage is applied for a long time. It is thought that this is attributed to entanglement of the binder resin and $R_{11}$ to $R_{14}$. It is presumed that entanglement with the binder resin restricts the movement of the carrier molecule, resulting in increase in the electric resistance.

For the reasons above, in the present invention, preferable are the carrier molecules having a large molecule size and a structure in which the carrier molecules are difficult to tangle with the binder resin. Among the carrier molecules, particularly suitable are the carrier molecules represented by the formulas (1) to (4) and the formulas (6) to (8).

Moreover, in the present invention, the carrier molecule represented by the formula (1) and the carrier molecule represented by the formula (2) are particularly suitable. Namely, the carrier molecules represented by the formula (1) and the formula (2) can sufficiently reduce the electric resistance of the charging member even under a low humidity environment because these carrier molecules are difficult to tangle with the binder resin in the electrically conductive layer and these carrier molecules have high hydrophobicity.

Further, the carrier molecule represented by the formula (1) is more difficult to tangle with the binder resin in the electrically conductive layer because the carrier molecule has a cyclic structure. For this reason, the carrier molecule can give higher conductivity to the electrically conductive layer in spite of its low carrier mobility.

Moreover, the carrier molecule according to the present invention is suitable because the carrier molecule has high affinity with the binder resin, and can be uniformly dispersed in the binder resin to reduce the unevenness of electric resistance attributed to uneven dispersion.

Further, the carrier molecule according to the present invention demonstrates a property of an ion liquid. Accordingly, the carrier molecule exists as a liquid even in a state where an amount of water is small, and can move in the binder resin. Further, the carrier molecule according to the present invention is suitable because the carrier molecule can improve reduction in the electric resistance under a low humidity environment. Here, the ion liquid means a molten salt having a melting point of not more than 100° C.

The electrically conductive layer according to the present invention may include a carrier molecule other than the carrier molecules represented by the formulas (1) to (10), the other carrier molecule contributing to ionic conduction. However, if several kinds of carrier molecules each having a different carrier mobility μ exist in the electrically conductive layer, the unevenness of electric resistance is likely to be produced in the electrically conductive layer. For this reason, the proportion of the carrier molecules represented by the formulas (1) to (10) to the carrier molecule contained in the electrically conductive layer according to the present invention and contributing to the ionic conduction is not less than 50 mol % and not more than 100 mol %, and particularly preferably not less than 70 mol % and not more than 100 mol %.

Existence of the carrier molecule according to the present invention in the electrically conductive layer and the amount thereof can be verified by extraction of the carrier molecule using an ion exchange reaction. The ion conductive resin is stirred in a diluted aqueous solution of hydrochloric acid or sodium hydroxide, and the carrier molecules in the ion conductive resin are extracted to the aqueous solution. The aqueous solution after extraction is dried, and the extracted product is recovered. Then, mass spectrometry can be performed using a time-of-flight mass spectrometer (TOF-MS) to identify the carrier molecule and determine the amount thereof. The carrier molecule in the extracted product is a cationic or anionic molecule. Accordingly, even if the molecular weight of the carrier molecule is large, the carrier molecule can be analyzed in the TOF-MS measurement without decomposing the carrier molecule. Further, an element analysis is performed by inductively coupled plasma (ICP) light emission analysis of the extracted product, and the result is combined with the result of the mass spectrometry. Thereby, the carrier molecule is more easily identified and the amount thereof is more easily determined.

(2) Binder Resin

As the binder resin according to the present invention, an ion conductive resin having one or both selected from a quaternary ammonium group and a sulfonate group in the molecule structure is used.

Preferably, as the ion conductive resin according to the present invention, those not having any other carrier molecule contributing to the ionic conduction than the carrier molecule according to the present invention as a counter ion of the quaternary ammonium group are used. This is for suppressing high unevenness of electric resistance to be produced in the electrically conductive layer due to co-existence of different kinds of carrier molecules each having a different carrier mobility in the electrically conductive layer.

For example, it is known that the electric resistance of ion conductive rubbers such as epichlorohydrin rubber is reduced by vulcanization. It is thought that this is because a vulcanization accelerator used for vulcanization forms a salt with chlorine released by heating, sulfur in an additive, and sulfur released from the vulcanization accelerator to demonstrate the function as the ion conductive agent. Namely, as a result of vulcanization, in the epichlorohydrin rubber, chlorine ions, sulfur ions, and ions derived from the vulcanization accelerator are generated as the carrier molecule.

For the reason above, preferred as the ion conductive resin according to the present invention are resins in which a compound that demonstrates ion conductivity by polymerization or heating is difficult to generate. Examples of the resins that meet the condition include ion exchange group-containing epoxy resins, urethane resins, ester resins, amide resins, imide resins, amideimide resins, phenol resins, vinyl resins, silicone resins, and fluorine resins.

The resins in the group above can be produced only from a monomer component or a polymer component as a raw material and an ion conductive agent that reacts with the resin to be bonded to the resin by a covalent bond. Accordingly, the kinds of the carrier molecules contributing to the ionic conduction can be minimized. In the present invention, among the resins in the group above, particularly preferred is the use of phenol resins. The phenol resin has a main chain skeleton formed from an aromatic ring. For this reason, the phenol resin is difficult to tangle with the carrier molecule, and suitable for the purpose of the present invention.

From the viewpoint of ionic conduction, the ion conductive resin preferably has an ethylene oxide unit in the molecule structure. The content of the ethylene oxide unit can be suitably set. The content of the ethylene oxide unit, however, is correlated with the amount of water in the ion conductive resin. Accordingly, the content of the ethylene oxide unit tends to govern dependency of the electric resistance value of the ion conductive resin on the temperature and humidity. For the reason above, preferably, the content of the ethylene oxide unit can be controlled in the range of not less than 30 wt % and not more than 80 wt %. More specifically, the content of the ethylene oxide unit is preferably not less than 40 wt % and not more than 60 wt %. At a content of not less than 40 wt %, increase in the electric resistance under a low temperature and low humidity environment can be prevented. At a content of not more than 60 wt %, reduction in the electric resistance under a high temperature and high humidity environment can be prevented. The content of the ethylene oxide unit can be calculated as the weight ratio of the ethylene oxide unit to the binder resin as the raw material.

<Method for Producing Ion Conductive Resin>
The ion conductive resin according to the present invention can be produced, for example, using (1) the ion conductive agent as a raw material and (2) a polymer or monomer as a raw material for the binder resin according to the following method.

(1-1) Preparation of Ion Conductive Agent as Raw Material;
As the raw material for the ion conductive resin, an ion conductive agent is prepared, the ion conductive agent having a portion chemically reactive with the binder resin and one of a quaternary ammonium group and a sulfonate group. Here, examples of the portion chemically reactive with the binder resin include bonding sites of halogen atoms (fluorine, chlorine, bromine, and iodine atoms) and reactive functional groups. Specific examples of the reactive functional group include acid groups such as a carboxyl group and acid anhydrides, a hydroxyl group, an amino group, a mercapto group, an alkoxy group, a vinyl group, a glycidyl group, an epoxy group, a nitrile group, and a carbamoyl group.

(1-2) Introduction of Carrier Molecule into Ion Conductive Agent;
Next, the carrier molecule according to the present invention is introduced into the ion conductive agent prepared in (1-1). Specifically, an ion exchange reaction can be made between a salt of the carrier molecule according to the present invention and the quaternary ammonium group or sulfonate group of the ion conductive agent prepared in (1-1) to obtain an ion conductive agent into which the carrier molecule according to the present invention is introduced.

For example, the case where the ion conductive agent prepared in (1-1) is glycidyltrimethylammonium chloride will be described as an example. First, as the salt of the carrier molecule, lithium bis(trifluoromethanesulfonyl)imide is prepared. The ion conductive agent is dissolved in purified water and the salt of the carrier molecule is dissolved in purified water. Next, these aqueous solutions are mixed and stirred to make an ion exchange reaction. Thereby, highly ion exchangeable chlorine ions are replaced by bis(trifluoromethanesulfonyl)imide ions.

In this case, the generated glycidyltrimethylammonium bis(trifluoromethanesulfonyl)imide is an ion liquid demonstrating hydrophobicity, and thus water soluble lithium chloride as a by-product can easily be removed. Similarly, all the ion conductive agents including the carrier molecule according to the present invention have the properties of the ion liquid; accordingly, even if the reactive ion conductive agent obtained by the method is hydrophilic, a solvent such as chloroform, dichloromethane, dichloroethane, and methyl isobutyl ketone can be selected to easily remove the by-product.

(2) Reaction of ion conductive agent with raw material polymer or raw material monomer for binder resin; The polymer or monomer as a raw material for the binder resin can be used without limitation in particular as long as it reacts with the reactive functional group contained in the ion conductive agent. Specific examples thereof include: compounds having two or more reactive functional groups such as polyglycidyl compounds, polyamine compounds, polycarboxy compounds, polyisocyanate compounds, polyhydric alcohol compounds, phenol compounds, and vinyl compounds; and compounds capable of polymerizing alone.

A method for synthesizing the ion conductive resin according to the present invention will be described using an example in which as the ion conductive agent according to (1-2), used is an ion conductive agent in which chlorine ion of glycidyltrimethylammonium chloride is ion exchanged with cyclohexafluoropropane-1,3-bis(sulfonyl)imide.
As the raw material polymer for the binder resin, polypropylene glycol diglycidyl ether and polypropylene glycol bis(2-aminopropyl ether) are prepared.

Then, the ion conductive agent and the raw material polymer are dissolved in a solvent such as isopropyl alcohol to prepare a coating material.

The coating film of the coating material is heated at a temperature of 90 to 200° C. to react a glycidyl group with an amino group. Thus, an ion conductive resin having the carrier molecule according to the present invention as the counter ion and having quaternary ammonium bonded thereto is obtained.

The amount of the ion conductive agent according to the present invention to be added can be properly set. Preferably, the ion conductive agent is blended with the polymer or monomer as the raw material for the binder resin in the proportion of not less than 0.5% by mass and not more than 20% by mass. This can provide an ion conductive resin that has high conductivity and is suitable for forming the electrically conductive layer in which the unevenness of electric resistance is difficult to produce. The method for synthesizing the ion conductive resin according to the present invention is not limited to the method above. For example, a method for synthesizing the ion conductive resin according to the present invention can be used in which an ion conductive resin into which an ion conductive agent having a proton or a halogen ion as a carrier molecule is introduced is synthesized, and the proton or the halogen ion is ion exchanged with the carrier molecule according to the present invention.

<Other Component>
A filler, a softening agent, a processing aid, a tackifier, an antitack agent, a dispersant, and a foaming agent usually used as compounding agents for the resin can be added to the ion conductive resin in the range such that the effect of the present invention is not impaired.

<Conductive Roller>
The electrically conductive member according to the present invention can be suitably used as a charging member for contacting a charged member such as a photosensitive member to charge the charged body, for example. The electrically conductive member according to the present invention can also be suitably used as a charging member in a process cartridge including an image bearing member and the charging member that contacts the image bearing member to charge the image bearing member by applying voltage to the image bearing member, the process cartridge being detachably attached to the main body of an image forming apparatus.

The ion conductive resin according to the present invention can also be used for a developing member, a transfer member, a discharging member, and a conveying member as a sheet feeding roller other than the charging member such as a charging roller.

FIGS. 1A to 1C are schematic views illustrating one embodiment of a charging roller as an electrophotographic electrically conductive member according to the present invention. The charging roller may have a single layer structure including a core metal 11 and an elastic layer 12 provided on the outer periphery thereof, as illustrated in FIG. 1A. Alternatively, the charging roller may have a two-layer structure in which a surface layer 13 is disposed on the outer side of the elastic layer 12, as illustrated in FIG. 1B. Further, as illustrated in FIG. 1C, the charging roller may have a multi-layer structure in which several layers such as an intermediate layer 14 and an adhesive layer are disposed between the elastic layer 12 and the surface layer 13. At least one of the elastic layer 12, the surface layer 13, and the intermediate layer 14 in FIGS. 1A to 1C is the electrically conductive layer. The ion conductive resin according to the present invention may be used for any of these layers.

Further, a portion close to the surface of the charging roller commits discharging as the charging roller. Accordingly, the ion conductive resin according to the present invention that can improve the unevenness of discharge is preferably used for the portion close to the surface layer of the charging roller.

In this case, the ion conductive resin according to the present invention does not always need to be used for the outermost layer. The outermost layer may be subjected to an antitack treatment in order to prevent adhesion of a toner and an external additive as long as the unevenness of discharge is not influenced by the treatment. As the antitack treatment of the outermost layer, the surface of the charging roller may be irradiated with an energy beam such as an electron beam, ultraviolet rays, X-rays, and a microwave to cure the surface of the charging roller and form an antitack surface; or an antitack resin such as acrylic resins, polyurethanes, polyamides, polyesters, polyolefins, and silicone resins may be formed as the outermost surface layer.

As a guideline, the electric resistance of the electrically conductive member according to the present invention is not less than $1 \times 10^3$ Ω·cm and not more than $1 \times 10^9$ Ω·cm. The effect is produced if the electric resistance is not less than $1 \times 10^5$ Ω·cm and not more than $1 \times 10^8$ Ω·cm. At an electric resistance of not less than $1 \times 10^5$ Ω·cm, abnormal discharging caused by leakage can be suppressed. At an electric resistance of not more than $1 \times 10^8$ Ω·cm, image defects caused by insufficient electric resistance can be suppressed.

In the case where the ion conductive resin according to the present invention is used as the surface layer 13 of the elastic layer 12 as illustrated in FIG. 1B, a rubber component that forms the elastic layer 12 is not particularly limited, and a known rubber in the field of the electrophotographic electrically conductive member can be used. Specifically, examples of the rubber include epichlorohydrin homopolymers, epichlorohydrin-ethylene oxide copolymers, epichlorohydrin-ethylene oxide-allyl glycidyl ether ternary polymers, acrylonitrile-butadiene copolymers, hydrogenated acrylonitrile-butadiene copolymers, acrylic rubbers, and urethane rubbers.

In the case where the ion conductive resin according to the present invention is used as the elastic layer 12 or as the intermediate layer between the elastic layer 12 and the surface layer 13, a known resin in the field of the electrophotographic electrically conductive member can be used for the surface layer 13. Specifically, examples of the resin include acrylic resins, polyurethanes, polyamides, polyesters, polyolefins, and silicone resins. For the resin that forms the surface layer, when necessary, carbon black, graphite, and an oxide having conductivity such as tin oxide, a metal such as copper and silver, conductive particles whose surface is coated with an oxide or a metal to have conductivity, and an ion conductive agent having an ion exchange ability such as quaternary ammonium salts may be used.

Electrophotographic Apparatus

Figure 4:
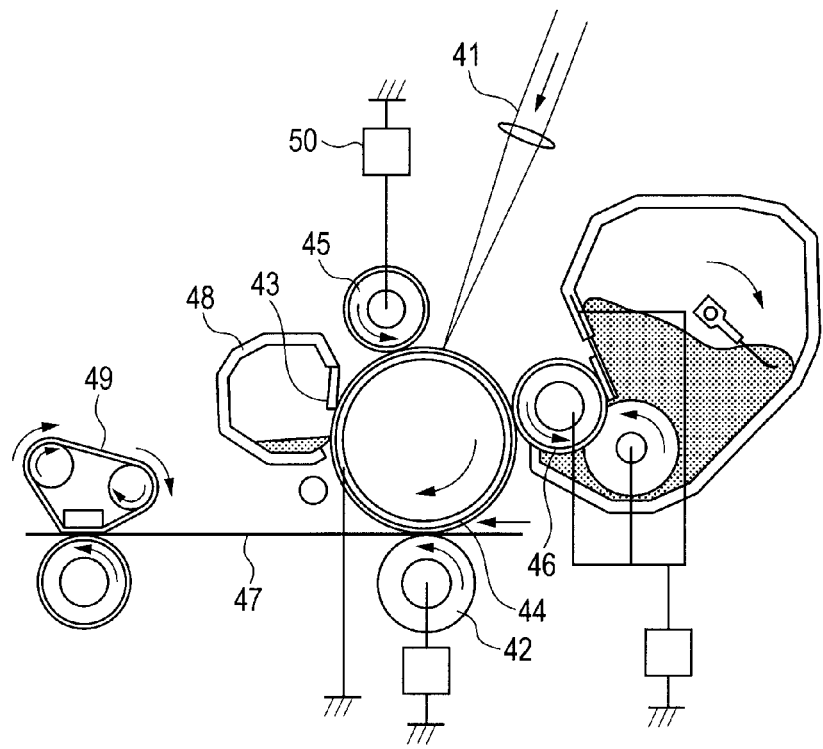
FIG. 4 is an explanatory view of an electrophotographic apparatus according to the present invention.

As the electrophotographic apparatus according to the present invention, any electrophotographic apparatus having the electrophotographic electrically conductive member according to the present invention may be used. As one example, a schematic configuration of the electrophotographic apparatus according to the present invention is illustrated in FIG. 4. The electrophotographic apparatus according to the present invention includes a process cartridge in which an electrophotographic photosensitive member 44 (hereinafter, also referred to as a "photosensitive member") and a charging apparatus including a charging member 45 formed from the electrically conductive member according to the present invention are integrally formed; a latent image forming apparatus, not illustrated; a developing apparatus that forms the latent image into a toner image; and a transfer apparatus that transfers the toner image onto a transfer material 47 such as paper. Further, the electrophotographic apparatus according to the present invention includes a cleaning apparatus 48 that recovers the remaining toner on the photosensitive member after transfer of the toner image, and a fixing apparatus 49 that fixes the toner image on the transfer material.

The photosensitive member 44 is a rotary drum having a photosensitive layer on a conductive substrate, and rotated and driven in the arrow direction at a predetermined circumferential speed (process speed). A predetermined voltage from an AC power supply 50 is applied to the charging roller 45. The charging roller 45 rotates by following the rotation of the photosensitive member with which the charging roller 45 is brought into contact at a predetermined pressure. Thereby, the charging roller 45 charges the photosensitive member at a predetermined potential. The latent image forming apparatus, not illustrated, includes an exposing apparatus such as a laser beam scanner that outputs laser light 41, a latent image being formed on the photosensitive member 44 by the laser light 41. The photosensitive member 44 is irradiated with the laser light 41 modulated according to image information to form an electrostatic latent image on the photosensitive member 44 uniformly charged.

A toner having the same polarity as that of the photosensitive member 44 is conveyed, and the electrostatic latent image formed on the photosensitive member 44 is developed by reversal development by a developing sleeve or developing roller 46 arranged in the vicinity of or in contact with the photosensitive member 44. Thus, the electrostatic latent image is developed to form a toner image. The toner image on the photosensitive member 44 is transferred onto a transfer material 47 such as a normal paper conveyed by a sheet feeding system between a transfer roller 42 and the photosensitive member in the transfer apparatus. Subsequently, in the fixing apparatus 49, the toner image on the transfer material 47 is fixed onto the transfer material by a heating roller or the like. The transfer material is ejected to the outside of the apparatus to obtain an output image.

On the other hand, the remaining toner on the photosensitive member 44 is mechanically scraped by a blade type cleaning member 43 in the cleaning apparatus 48, and recovered in a recovery container in the cleaning apparatus 48. Here, if a simultaneous developing and cleaning method is used in which the transfer remaining toner is recovered by the developing apparatus, the cleaning apparatus can be eliminated.

Process Cartridge

A process cartridge according to the present invention includes, for example, the charging roller 45 formed from the electrically conductive member according to the present invention and other electrophotographic member such as the photosensitive member 44, the charging roller 45 and the other electrophotographic member being integrally formed. The process cartridge according to the present invention is detachably attached to the main body of the electrophotographic apparatus.

Figure 5:
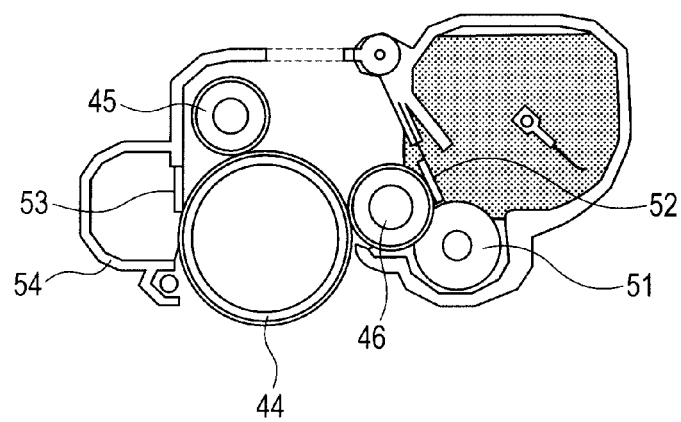
FIG. 5 is an explanatory view of a process cartridge according to the present invention.

The sectional view of the process cartridge according to the present invention is illustrated in FIG. 5. The process cartridge illustrated in FIG. 5 includes the photosensitive member 44, the charging apparatus having the charging roller 45, the developing apparatus having the developing roller 46, and a toner feeding roller 51, and a developing blade 52, and the cleaning apparatus 54 having the cleaning blade 53, which are integrally formed. The process cartridge is detachably attached to the main body of the electrophotographic apparatus.

EXAMPLES

Hereinafter, Examples of the present invention will be described.

A: Preparation of coating solutions for forming electrically conductive layer Nos. 1 to 42;

<Preparation Example A1: Preparation of Coating Solution No. 1>

(1-1) Preparation of Ion Conductive Agent;

As the ion conductive agent having a reactive functional group, 8.56 g (56.5 mmol) of glycidyltrimethylammonium chloride was dissolved in 50 ml of purified water, and stirred for 1 hour to obtain an aqueous solution of an ion conductive agent.

Next, 16.22 g (56.5 mmol) of cyclohexafluoropropane-1,3-bis(sulfonyl)imide lithium was dissolved in 50 ml of purified water, and stirred for 1 hour.

The obtained aqueous solution was mixed, and stirred for 2 hours to make a reaction. The reaction solution was left as it was for 12 hours, and separated into two layers: an aqueous layer in which lithium chloride as a reaction by-product was dissolved, and an oil layer including a glycidyltrimethylammonium salt ion conductive agent having cyclohexafluoropropane-1,3-bis(sulfonyl)imide. Using a separating funnel, the lower oil layer was recovered. Subsequently, the recovered oil layer was washed twice with purified water to remove a small amount of remaining lithium chloride in the oil layer. Thus, an ion conductive agent having a glycidyl group as a reactive functional group was prepared.

(1-2) Synthesis of Ion Conductive Resin;

As the raw material polymer for the ion conductive resin, polypropylene glycol diglycidyl ether (weight average molecular weight: 640) and polypropylene glycol bis(2-aminopropyl ether) (weight average molecular weight: 400) were prepared.

0.47 g of the ion conductive agent obtained in (1-1), 13.68 g (21.4 mmol) of polypropylene glycol diglycidyl ether, and 10.27 g (25.6 mmol) of polypropylene glycol bis(2-aminopropyl ether) were dissolved in isopropyl alcohol (IPA), and the solid content was adjusted to 27% by weight to prepare a coating solution No. 1 for an electrically conductive layer.

<Preparation Examples 2 to 42: Coating Solutions Nos. 2 to 42>

Coating solutions Nos. 2 to 42 were prepared in the same manner as in the coating solution No. 1 except that the kind of the ion conductive agent, the kind of the carrier molecule used for ion exchange, the raw material for the ion conductive resin, and the amount of the ion conductive agent to be added were changed as shown in Table 1.

In Table 1, the names of the compounds represented by symbols A-1 to A-7 for the kind of the ion conductive agent, symbols B-1 to B-15 for the kind of the carrier molecule used for ion exchange, and symbols C-1 to C-11 for the raw material monomer/raw material polymer for the ion conductive resin are shown in Table 2 to Table 4.

TABLE 1

| Coating solution No. | Ion conductive agent Kind of ion conductive agent containing reactive group before ion exchange | Kind of carrier molecular used for ion exchange | Amount to be added (parts by mass) | Ion conductive resin raw material monomer/raw material polymer Kind | Mass ratio | EO content (% by mass) |
|---|---|---|---|---|---|---|
| 1 | A-1 | B-1 | 2 | C-2 and C-4 | C-2/C-4 = 53/47 | 0 |
| 2 | A-1 | B-1 | 2 | C-2 and C-3 | C-2/C-3 = 68/32 | 18.8 |
| 3 | A-1 | B-1 | 2 | C-1, C-2, and C-3 | C-1/C-2/C-3 = 42/30/28 | 48.2 |
| 4 | A-1 | B-1 | 2 | C-1 and C-3 | C-1/C-3 = 75/25 | 70.7 |
| 5 | A-1 | B-1 | 1 | C-1, C-2, and C-3 | C-1/C-2/C-3 = 42/30/28 | 48.2 |
| 6 | A-1 | B-1 | 5 | " | " | 48.2 |
| 7 | A-1 | B-1 | 10 | " | " | 48.2 |
| 8 | A-1 | B-2 | 2 | " | " | 48.2 |
| 9 | A-1 | B-3 | 2 | " | " | 48.2 |
| 10 | A-1 | B-4 | 2 | " | " | 48.2 |
| 11 | A-1 | B-5 | 2 | " | " | 48.2 |
| 12 | A-1 | B-6 | 2 | " | " | 48.2 |
| 13 | A-1 | B-7 | 2 | " | " | 48.2 |
| 14 | A-2 | B-8 | 2 | " | " | 48.2 |
| 15 | A-2 | B-9 | 2 | " | " | 48.2 |
| 16 | A-2 | B-10 | 2 | " | " | 48.2 |
| 17 | A-2 | B-11 | 2 | " | " | 48.2 |
| 18 | A-2 | B-12 | 2 | " | " | 48.2 |
| 19 | A-2 | B-13 | 2 | " | " | 48.2 |
| 20 | A-2 | B-14 | 2 | " | " | 48.2 |
| 21 | A-2 | B-15 | 2 | " | " | 48.2 |
| 22 | A-1 | B-1 | 2 | C-5 | 100 | 0 |
| 23 | A-1 | B-1 | 2 | C-1 and C-5 | C-1/C-5 = 65/35 | 50 |
| 24 | A-1 | B-1 | 10 | " | " | 50 |
| 25 | A-1 | B-4 | 2 | " | " | 50 |
| 26 | A-1 | B-5 | 2 | " | " | 50 |
| 27 | A-1 | B-6 | 2 | " | " | 50 |
| 28 | A-1 | B-7 | 2 | " | " | 50 |
| 29 | A-3 | B-8 | 2 | " | " | 50 |
| 30 | A-3 | B-9 | 2 | " | " | 50 |
| 31 | A-3 | B-10 | 2 | " | " | 50 |
| 32 | A-3 | B-11 | 2 | " | " | 50 |
| 33 | A-3 | B-12 | 2 | " | " | 50 |
| 34 | A-3 | B-13 | 2 | " | " | 50 |
| 35 | A-3 | B-14 | 2 | " | " | 50 |
| 36 | A-3 | B-15 | 2 | " | " | 50 |
| 37 | A-4 | B-4 | 2 | C-6 and C-7 | C-6/C-7 = 61/39 | 0 |
| 38 | A-4 | B-4 | 2 | C-6 and C-8 | C-6/C-8 = 49/51 | 46.7 |
| 39 | A-5 | B-8 | 2 | " | " | 46.7 |
| 40 | A-6 | B-4 | 2 | C-9 and C-10 | C-9/C-10 = 59/41 | 0 |
| 41 | A-6 | B-4 | 2 | C-10 and C-11 | C-10/C-11 = 19/81 | 47.2 |
| 42 | A-7 | B-8 | 2 | " | " | 47.2 |

TABLE 2

| | Ion conductive agent having reactive functional group |
|---|---|
| A-1 | Glycidyltrimethylammonium chloride |
| A-2 | Taurine |
| A-3 | p-Hydroxybenzenesulfonic acid |
| A-4 | Choline |
| A-5 | Hydroxymethanesulfonic acid |
| A-6 | Dimethylaminoethyl acrylate |
| A-7 | Vinylsulfonic acid |

TABLE 3

| | Carrier molecule used for ion exchange |
|---|---|
| B-1 | Bis(trifluoromethylsulfonyl)imide |
| B-2 | Bis(pentafluoroethylsulfonyl)imide |
| B-3 | Bis(nonafluorobutanesulfonyl)imide |
| B-4 | Cyclo-hexafluoropropane-1,3-bis(sulfonyl)imide |
| B-5 | Hexafluorophosphoric acid |
| B-6 | Tetrafluoroboric acid |
| B-7 | Butanesulfonic acid |
| B-8 | 1-Ethyl-3-methylimidazolium |
| B-9 | 1-Hexyl-3-methylimidazolium |
| B-10 | 1-Ethyl-2,3-dimethylimidazolium |
| B-11 | 1-Ethyl-3-methylpyridinium |
| B-12 | 1-Butyl-1-methylpyrrolidinium |
| B-13 | Tetrabutylphosphoric acid |
| B-14 | Tetrabutylammonium |
| B-15 | Dodecyltrimethylammonium |

TABLE 4

| | Raw material polymer for binder resin or raw material monomer for binder resin |
|---|---|
| C-1 | Polyethylene glycol diglycidyl ether (weight average molecular weight: 526) |
| C-2 | Polypropylene glycol diglycidyl ether (weight average molecular weight: 640) |
| C-3 | 2,2-(Ethylenedioxy)bis(ethylamine) |
| C-4 | Polypropylene glycol bis(2-aminopropyl ether) (weight average molecular weight: 400) |
| C-5 | Resol-type phenol resin solution (containing 50% by weight of methanol) weight average molecular weight of resol-type phenol resin: 960 |
| C-6 | Hexamethylene diisocyanate |
| C-7 | Hexanediol |
| C-8 | Polyethylene glycol (weight average molecular weight: 1000) |
| C-9 | n-Butyl acrylate |
| C-10 | Methyl methacrylate |
| C-11 | Polyethylene glycol diacrylate (weight average molecular weight: 508) |

B: Production of Elastic Rollers Nos. 1 and 2;
<Preparation Example B1: Production of Elastic Roller No. 1)
The raw materials shown in Table 5 were mixed by an open roll mill to obtain an unvulcanized rubber composition.

TABLE 5

| | |
|---|---|
| Epichlorohydrin-ethylene oxide-allyl glycidyl ether ternary copolymer (GECO) (trade name: EPICHLOMER CG-102 made by Daiso Co., Ltd.) | 100 parts by mass |
| Zinc oxide (two zinc oxides made by Seido Chemical Industry Co., Ltd.) | 5 parts by mass |
| Calcium carbonate (trade name: Silver-W made by Shiraishi Calcium Kaisha, Ltd.) | 35 parts by mass |
| Carbon black (trade name: SEAST SO made by Tokai Carbon Co., Ltd.) | 0.5 parts by mass |
| Stearic acid | 2 parts by mass |

TABLE 5-continued

| | |
|---|---|
| Adipic acid ester (trade name: POLYCIZER W305ELS made by DIC Corporation) | 10 parts by mass |
| Sulfur | 0.5 parts by mass |
| Dipentamethylenethiuram tetrasulfide (trade name: NOCCELER TRA made by Ouchi Shinko Chemical Industrial Co., Ltd.) | 2 parts by mass |
| Cetyltrimethylammonium bromide | 2 parts by mass |

Next, in a crosshead extruder, an apparatus including a core metal feeding mechanism and a conductive roller discharging mechanism was prepared. A conveying rate of the core metal was 60 mm/sec. A die having an inner diameter of $\phi$12.5 mm was mounted on the crosshead. The temperature of the extruder and that of the crosshead were adjusted to 80° C. A layer of an unvulcanized rubber composition was formed on the circumference of the core metal fed to the crosshead, the core metal being a stainless steel bar having an outer diameter of $\phi$6 mm and a length of 258 mm. Next, the core metal having the circumferential surface coated with the layer of the unvulcanized rubber composition was placed in a hot air vulcanization furnace at 170° C., and heated for 60 minutes to crosslink the layer of the unvulcanized rubber composition. Thus, a rubber elastic layer was formed. Subsequently, ends of the rubber elastic layer were cut and removed such that the length of the rubber was 228 mm. Finally, the surface of the rubber elastic layer was polished by a recovery grinding wheel, and molded into a crown shape having a central diameter of 12 mm and an average diameter of 11.8 mm of both ends located 90 mm left and right from the central portion. Thus, an elastic roller No. 1 was obtained.

<Preparation Example B2: Production of Elastic Roller No. 2>

An elastic roller No. 2 was produced in the same manner as in the elastic roller No. 1 except that an unvulcanized rubber composition obtained by mixing the raw materials shown in Table 6 below by an open roll mill was used.

TABLE 6

| | |
|---|---|
| Acrylonitrile-butadiene copolymer (NBR) (trade name: Nipol DN219 made by ZEON Corporation) | 100 parts by mass |
| Zinc oxide (two zinc oxides made by Seido Chemical Industry Co., Ltd.) | 5 parts by mass |
| Calcium carbonate (trade name: Silver-W made by Shiraishi Calcium Kaisha, Ltd.) | 20 parts by mass |
| Carbon black (trade name: SEAST SO made by Tokai Carbon Co., Ltd.) | 38 parts by mass |
| Stearic acid | 2 parts by mass |
| Sulfur | 0.5 parts by mass |
| Dipentamethylenethiuram tetrasulfide (trade name: NOCCELER TRA made by Ouchi Shinko Chemical Industrial Co., Ltd.) | 2 parts by mass |

<Preparation Example B3: Production of Elastic Roller No. 3>

A stainless steel bar having a diameter of 6 mm and a length of 258 mm was disposed within a cylindrical metal mold. A liquid silicone rubber mixture including the materials shown in Table 7 below was injected and filled into the cavity of the cylindrical metal mold.

TABLE 7

| | |
|---|---|
| Liquid silicone rubber (trade name: SE6724 A/B made by Dow Corning Toray Co., Ltd.) | 100 parts by mass |
| Carbon black (trade name: TOKABLACK #7360SB made by Tokai Carbon Co., Ltd.) | 35 parts by mass |

TABLE 7-continued

| | |
|---|---|
| Silica powder | 0.2 parts by mass |
| Platinum catalyst | 0.1 parts by mass |

Next, the cylindrical metal mold was heated at a temperature of 120° C. for 8 minutes, and cooled to a temperature of 25° C. Then, the stainless steel bar having a silicone rubber layer formed on the circumferential surface thereof was released from the mold. Subsequently, the silicone rubber layer was treated at a temperature of 200° C. for 60 minutes to cure the silicone rubber layer. Thus, an elastic roller No. 3 was obtained, an elastic layer having a thickness of 3.0 mm being formed on the circumferential surface of the stainless steel bar.

Example 1

Production of Charging Roller No. 1

The elastic roller No. 1 was dipped once in the coating solution No. 1 prepared above to form a coating film of the coating solution No. 1 on the surface of the elastic layer. The time for dipping coating was 9 seconds, and a dipping coating pulling rate was adjusted such that an initial rate was 20 mm/sec and the final rate was 2 mm/sec. The rate was linearly changed with time between 20 mm/sec and 2 mm/sec. Subsequently, the elastic roller 1 having the coating film formed on the surface thereof was left as it was in an environment at a temperature of 25° C. for 30 minutes. Next, the elastic roller 1 was placed for 1 hour in a hot air circulating dryer set at a temperature of 90° C. Further, the elastic roller 1 was placed for 1 hour in the hot air circulating dryer set at a temperature of 160° C. to react the coating film. Thus, a surface layer as the electrically conductive layer was formed on the elastic layer. Thus, the charging roller No. 1 was obtained. The charging roller No. 1 was subjected to evaluations as follows.

Figure 2A:
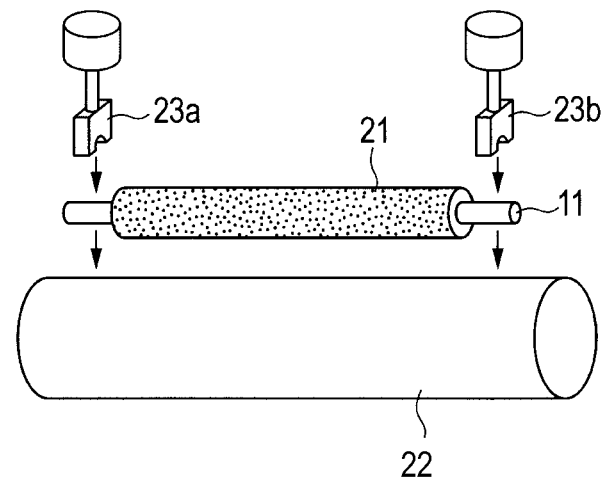
FIG. 2A is a schematic view of a current value measuring apparatus.
Figure 2B:
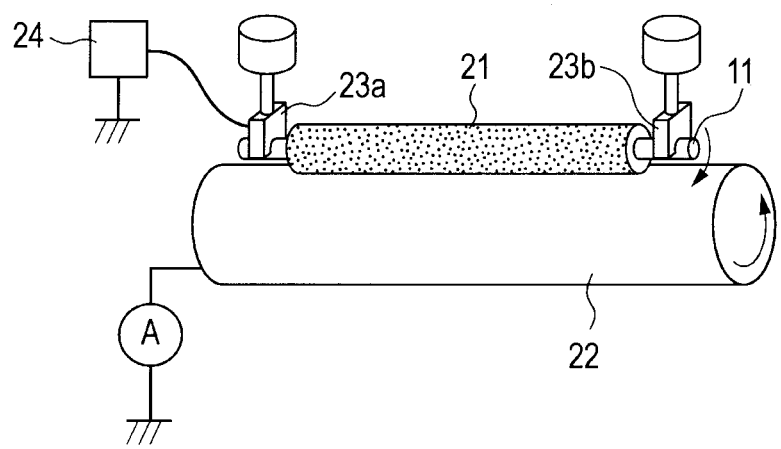
FIG. 2B is a schematic view of a current value measuring apparatus.

<Evaluation 1; Measurement of Volume Resistivity>
The current value of the charging roller was measured, and the volume resistivity of the charging roller No. 1 was calculated using the result of measurement.
FIGS. 2A and 2B are explanatory views illustrating a method for measuring the current value of the charging roller. As illustrated in FIGS. 2A and 2B, at the same load as that on the charging roller when the electrophotographic image forming apparatus is used, the charging roller is brought into contact with a metal cylinder 22 having the same curvature as that of the photosensitive member in the electrophotographic apparatus. In this state, the current was flowed, and the current value at this time was measured. FIG. 2A illustrates bearings 23a and 23b each fixed to a weight, and a charging roller 21 to be tested. Then, stress is vertically and downwardly applied to both ends of the electrically conductive support 11 for the charging roller 21. Vertically below the charging roller, a metal cylinder 22 is disposed such that the rotation axis of the metal cylinder 22 is parallel to that of the charging roller 21. As illustrated in FIG. 2B, the charging roller is pressed against the bearings 23a and 23b by a driving apparatus, not illustrated, while the metal cylinder 22 is rotated. The DC voltage of −200 V is applied by a power supply 24 while the metal cylinder 22 is rotated at the same rotational speed as that of the photosensitive member when the electrophotographic apparatus is used and the charging roller 21 is rotated in a way that follows the rotation of the metal cylinder 22. After 2 seconds since the voltage is applied, the time average of the current flowed from the cylinder metal 22 was measured by an ammeter A, and the time average of the results obtained by the measurement for 5 seconds was calculated. In this evaluation, two charging rollers No. 1 to be tested were prepared.

One of the charging rollers No. 1 was placed at a temperature of 23° C./humidity of 55% R.H. (N/N environment) for 48 hours to acclimatize the charging roller No. 1 to the N/N environment. Subsequently, under the same environment, a force of 5 N was applied to each of both ends of the charging roller No. 1 to bring the charging roller No. 1 into contact with the cylinder metal having a diameter of 30 mm. The current value was measured while the cylinder metal was rotated at a circumferential speed of 150 mm/s, and the electric resistance value was determined.
The other charging roller No. 1 was placed in an environment at a temperature of 15° C./humidity of 10% R.H. (L/L environment) for 48 hours to acclimatize the charging roller to the L/L environment. Subsequently, under the same environment, a force of 5 N was applied to each of both ends of the charging roller No. 1 to bring the charging roller No. 1 into contact with the cylinder metal having a diameter of 30 mm. The current value was measured while the cylinder metal was rotated at a circumferential speed of 150 mm/s, and the electric resistance value was determined.
The electrical resistivity of the charging roller No. 1 under the L/L environment was divided by the electrical resistivity of the charging roller No. 1 under the N/N environment, and converted into the logarithm. The logarithm was defined as an environmental fluctuation digit. Thereby, dependency of the electrical resistivity of the charging roller No. 1 upon the environmental fluctuation can be evaluated.

<Evaluation 2: Evaluation of Bleeding>
The charging roller No. 1 was placed on a polyethylene terephthalate (PET) sheet, and a load of 500 g was applied to each of both ends of the shaft of the charging roller No. 1 to bring the surface of the charging roller No. 1 into contact with the PET sheet. This state was kept under an environment of a temperature of 40° C./humidity of 95% R.H. for one week. Subsequently, the charging roller No. 1 was removed from the PET sheet, and the surface of the PET sheet contacted by the charging roller No. 1 was observed with an optical microscope (magnification of 10 times). It was checked whether bleeding objects permeated from the elastic layer of the charging roller No. 1 through the surface layer thereof and adhered to the surface of the PET sheet, and evaluation was made according to the criteria shown in Table 8 below.

TABLE 8

| Rank | Criteria for evaluation |
|---|---|
| A | No adhesion of bleeding objects is found in the surface of the PET sheet contacted by the charging roller. |
| B | "Cloudiness" caused by slight adhesion of bleeding objects is found in the surface of the PET sheet contacted by the charging roller. |
| C | Adhesion of bleeding objects is found all over the surface of the PET sheet contacted by the charging roller. |

<Evaluation 3: Evaluation of Charging Ability>
An electrophotographic laser printer (trade name: Laserjet 4700dn) was modified such that a recording medium output speed was 300 mm/sec. The charging roller No. 1 was mounted on the modified laser printer as the charging roller. The laser printer has an image resolution of 600 dpi.
The laser printer was intermittently operated to form an image, and 40001 sheets of an electrophotographic image were output. The intermittent operation to form an image means that after two sheets of an image are output, rotation of the electrophotographic photosensitive member drum is stopped for approximately 3 seconds, and the operation to form an image is performed again. The image output at this time was a character image having a printing density of 1% from the first sheet to the 40000th sheet, and a halftone image for the last one sheet. Here, the halftone image was an image in which horizontal lines were drawn at a width of 1 dot in the direction perpendicular to the rotational direction of the electrophotographic photosensitive member and an interval of 2 dots. The 40001th sheet of the halftone image was visually observed, and evaluation was made according to the criteria shown in Table 9 below.

TABLE 9

| Rank | Criteria for evaluation |
|------|-------------------------|
| A | No horizontal streaks attributed to the charging roller are found in the halftone image. |
| B | Extremely slight horizontal streaks attributed to the charging roller are found in part of the halftone image. |
| C | Slight horizontal streaks attributed to the charging roller are found in part of the halftone image. |
| D | Clear horizontal streaks attributed to the charging roller are found in the halftone image. |

<Evaluation 4: Evaluation Using Dot-Like Defects in Image>

The charging roller No. 1 was mounted on an electrophotographic laser printer (trade name: Laserjet 4515n, made by Hewlett-Packard Company) as the charging roller. The laser printer has a recording medium output speed of 370 mm/sec and an image resolution of 1200 dpi.

The laser printer was intermittently operated to form an image, and 40000 sheets of an electrophotographic image were output. The intermittent operation to form an image means that after two sheets of an image are output, rotation of the electrophotographic photosensitive member drum is stopped for approximately 3 seconds, and the operation to form an image is performed again.

The image output at this time was an H-Line image. The H-Line image was an image in which horizontal lines were drawn at a width of 2 dots in the direction perpendicular to the rotational direction of the electrophotographic photosensitive member and an interval of 176 dots. Subsequently, a halftone image was output at an AC voltage to be applied of −600 V and a frequency of 2931 Hz, while the AC voltage to be applied was raised from Vpp=1200 V. Then, the voltage at which dot-like defects in the image disappeared was measured. According to this evaluation, as dot-like defects in an image disappear at a lower voltage, the electric resistance value is more uniform in the charging roller.

<Evaluation 5: Molar Ratio of Carrier Molecule According to the Present Invention to all the Carrier Molecules in Electrically Conductive Layer>

The surface layer of the charging roller No. 1 was scraped, and dissolved in a diluted aqueous solution of hydrochloric acid to extract the carrier molecules in the ion conductive resin. The aqueous solution after extraction was dried to recover an extracted product. Then, mass spectrometry by a Time-of-Flight mass spectrometer (TOF-MS) and an ICP light emission analysis were performed to detect the amount of all the carrier molecules existing in the surface layer and the amount of the carrier molecule according to the present invention. Thus, the molar ratio of carrier molecule according to the present invention to all the carrier molecules in the electrically conductive layer was determined.

Examples 2 to 42

Charging rollers Nos. 2 to 42 were produced in the same manner as in the charging roller No. 1 except that coating solutions having a number shown in Table 10 were used for formation of the electrically conductive layer as the surface layer. These charging rollers were evaluated in the same manner as in the charging roller No. 1.

TABLE 10

| | | Evaluation 1 | | | | | Evaluation of image | |
|---|---|---|---|---|---|---|---|---|
| | | Volume resistivity | | Environmental fluctuation | | | | |
| Example | Coating solution No. | N/N Environment | L/L Environment | digit of volume resistivity | Evaluation 2 | Evaluation 3 | Evaluation 4 (kV) | Evaluation 5 (%) |
| 1 | 1 | 1.1E+07 | 3.4E+08 | 1.49 | A | C | 1.44 | 98 |
| 2 | 2 | 8.1E+06 | 1.9E+08 | 1.37 | A | C | 1.45 | 98 |
| 3 | 3 | 6.3E+06 | 2.5E+07 | 0.61 | A | A | 1.46 | 98 |
| 4 | 4 | 4.1E+06 | 2.4E+07 | 0.76 | A | B | 1.53 | 98 |
| 5 | 5 | 8.6E+06 | 3.9E+07 | 0.65 | A | A | 1.48 | 98 |
| 6 | 6 | 5.5E+06 | 2.1E+07 | 0.58 | A | A | 1.52 | 98 |
| 7 | 7 | 4.6E+06 | 1.8E+07 | 0.59 | B | A | 1.57 | 98 |
| 8 | 8 | 6.6E+06 | 2.9E+07 | 0.65 | A | A | 1.45 | 99 |
| 9 | 9 | 8.4E+06 | 3.2E+08 | 0.58 | A | A | 1.41 | 98 |
| 10 | 10 | 8.1E+06 | 2.6E+07 | 0.51 | A | A | 1.39 | 99 |
| 11 | 11 | 5.9E+06 | 3.2E+07 | 0.74 | A | A | 1.48 | 83 |
| 12 | 12 | 5.5E+06 | 4.1E+07 | 0.87 | A | B | 1.59 | 64 |
| 13 | 13 | 7.0E+06 | 4.5E+07 | 0.81 | A | B | 1.57 | 66 |
| 14 | 14 | 6.1E+06 | 3.2E+07 | 0.72 | A | A | 1.46 | 89 |
| 15 | 15 | 7.1E+06 | 4.0E+07 | 0.74 | A | B | 1.55 | 87 |
| 16 | 16 | 6.8E+06 | 3.3E+07 | 0.68 | A | A | 1.49 | 89 |
| 17 | 17 | 6.3E+06 | 3.1E+07 | 0.69 | A | A | 1.52 | 88 |
| 18 | 18 | 6.6E+06 | 3.5E+07 | 0.73 | A | B | 1.54 | 88 |
| 19 | 19 | 6.5E+06 | 4.5E+07 | 0.84 | A | B | 1.53 | 71 |
| 20 | 20 | 7.1E+06 | 5.2E+07 | 0.86 | A | B | 1.56 | 69 |
| 21 | 21 | 6.8E+06 | 4.9E+07 | 0.86 | A | B | 1.56 | 70 |
| 22 | 22 | 1.4E+07 | 1.1E+09 | 1.90 | A | C | 1.44 | 98 |
| 23 | 23 | 6.6E+06 | 2.7E+07 | 0.62 | A | A | 1.41 | 99 |
| 24 | 24 | 4.6E+06 | 2.5E+07 | 0.74 | B | A | 1.38 | 98 |
| 25 | 25 | 7.5E+06 | 2.5E+07 | 0.53 | A | A | 1.35 | 98 |
| 26 | 26 | 6.4E+06 | 3.3E+07 | 0.72 | A | B | 1.44 | 84 |
| 27 | 27 | 6.0E+06 | 4.3E+07 | 0.85 | A | B | 1.57 | 62 |
| 28 | 28 | 7.7E+06 | 6.3E+07 | 0.91 | A | B | 1.55 | 65 |

TABLE 10-continued

| | | Evaluation 1 | | | | | Evaluation of image | |
|---|---|---|---|---|---|---|---|---|
| | | Volume resistivity | | Environmental fluctuation | | | | |
| Example | Coating solution No. | N/N Environment | L/L Environment | digit of volume resistivity | Evaluation 2 | Evaluation 3 | Evaluation 4 (kV) | Evaluation 5 (%) |
| 29 | 29 | 6.4E+06 | 3.2E+07 | 0.70 | A | A | 1.43 | 90 |
| 30 | 30 | 7.7E+06 | 4.2E+07 | 0.73 | A | B | 1.56 | 87 |
| 31 | 31 | 7.2E+06 | 3.3E+07 | 0.67 | A | A | 1.52 | 89 |
| 32 | 32 | 6.7E+06 | 3.2E+07 | 0.68 | A | A | 1.53 | 89 |
| 33 | 33 | 7.1E+06 | 3.8E+07 | 0.73 | A | B | 1.56 | 87 |
| 34 | 34 | 7.0E+06 | 4.5E+07 | 0.81 | A | B | 1.51 | 70 |
| 35 | 35 | 7.4E+06 | 5.0E+07 | 0.83 | A | B | 1.53 | 71 |
| 36 | 36 | 7.2E+06 | 5.1E+07 | 0.85 | A | B | 1.55 | 71 |
| 37 | 37 | 9.1E+06 | 1.5E+09 | 2.23 | A | C | 1.43 | 98 |
| 38 | 38 | 7.6E+06 | 3.5E+07 | 0.66 | A | A | 1.42 | 98 |
| 39 | 39 | 7.4E+06 | 3.3E+07 | 0.66 | A | A | 1.47 | 89 |
| 40 | 40 | 8.9E+06 | 1.4E+09 | 2.20 | A | C | 1.43 | 98 |
| 41 | 41 | 7.4E+06 | 3.3E+07 | 0.66 | A | A | 1.43 | 98 |
| 42 | 42 | 7.1E+06 | 3.4E+07 | 0.68 | A | A | 1.48 | 90 |

Examples 43 to 53

Charging rollers Nos. 43 to 53 were produced in the same manner as in charging roller No. 1 except that the elastic roller No. 1 was replaced by the elastic roller No. 2 and the surface layer was formed using coating solutions having a number shown in Table 11, and were subjected to Evaluation 1 to Evaluation 5. The results are also shown in Table 11.

TABLE 11

| | | Evaluation 1 | | | | | Evaluation of image | |
|---|---|---|---|---|---|---|---|---|
| | | Volume resistivity (Ω·cm) | | Environmental fluctuation | | | | |
| Example | Coating solution No. | N/N Environment | L/L Environment | digit of volume resistivity | Evaluation 2 | Evaluation 3 | Evaluation 4 (kV) | Evaluation 5 (%) |
| 43 | 1 | 2.9E+07 | 8.5E+08 | 1.46 | A | C | 1.45 | 99 |
| 44 | 3 | 2.2E+07 | 4.4E+07 | 0.30 | A | B | 1.52 | 99 |
| 45 | 4 | 1.7E+07 | 4.1E+07 | 0.38 | A | B | 1.58 | 99 |
| 46 | 10 | 2.5E+07 | 4.6E+07 | 0.27 | A | B | 1.37 | 99 |
| 47 | 14 | 2.4E+07 | 5.3E+07 | 0.35 | A | B | 1.43 | 91 |
| 48 | 15 | 2.4E+07 | 5.7E+07 | 0.37 | A | B | 1.5 | 87 |
| 49 | 22 | 4.6E+07 | 1.7E+09 | 1.57 | A | C | 1.41 | 99 |
| 50 | 23 | 2.9E+07 | 7.4E+07 | 0.40 | A | B | 1.38 | 99 |
| 51 | 25 | 3.3E+07 | 7.6E+07 | 0.36 | A | B | 1.33 | 99 |
| 52 | 29 | 3.1E+07 | 8.1E+07 | 0.42 | A | B | 1.4 | 90 |
| 53 | 30 | 3.2E+07 | 9.0E+07 | 0.45 | A | B | 1.52 | 89 |

Example 54

A stainless steel bar having a diameter of 6 mm and a length of 258 mm was disposed within a cylindrical metal mold. A resin mixture obtained by removing IPA from the coating solution No. 3 was injected and filled into the cavity of the cylindrical metal mold. Next, the cylindrical metal mold was heated at a temperature of 90° C. for 1 hour, and further heated at a temperature of 160° C. for 1 hour. Subsequently, the cylindrical metal mold was cooled to a temperature of 25° C. Then, the stainless steel bar having an electrically conductive layer formed on the circumferential surface thereof was released from the mold, the electrically conductive layer having a thickness of 3.0 mm. This is the charging roller No. 54.

The charging roller No. 54 was subjected to Evaluation 1 to Evaluation 5. The result is shown in Table 12.

Example 55

A protective layer was provided on the surface layer of the elastic roller No. 10 according to the following method. Methyl isobutyl ketone was added to a caprolactone-modified acrylic polyol solution, and the solution was adjusted such that the solid content was 10% by mass. The mixed solution was adjusted by adding 15 parts by mass of carbon black (HAF), 35 parts by mass of needle-like rutile titanium oxide fine particles, 0.1 parts by mass of modified dimethyl silicone oil, and 80.14 parts by mass of a mixture of a butanone oxime block body of hexamethylene diisocyanate (HDI) and that of isophorone diisocyanate (IPDI) at 7:3 based on 100 parts by mass of the solid content in the acrylic polyol solution. At this time, the mixture of block HDI and block IPDI was added such that "NCO/OH=1.0" was satisfied.

210 g of the mixed solution and 200 g of glass beads as a medium having an average particle size of 0.8 mm were mixed in a 450 mL glass bottle, and dispersed for 24 hours using a paint shaker dispersion machine. After dispersion, 5.44 parts by mass (20 part by weight equivalent based on 100 part by weight of acrylic polyol) of crosslinking acrylic particles (trade name: MR50G; made by Spoken Chemical & Engineering Co., Ltd.) as resin particles was added, and the mixed solution was further dispersed for 30 minutes to obtain a coating material for forming a protective layer.

The obtained coating material for forming a protective layer was applied onto the outer periphery of the charging roller in Example 10 once by dip coating, and dried by air at normal temperature for 30 or more minutes. Next, the coating material was dried by a hot air circulating dryer set at 90° C. for 1 hour, and further dried by the hot air circulating dryer set at 160° C. for 1 hour to form an outermost layer on the charging roller. The time for dipping coating was 9 seconds, and a dip coating pulling rate was adjusted such that an initial rate was 20 mm/sec and the final rate was 2 mm/sec. The rate was linearly changed with time between 20 mm/sec and 2 mm/sec. As above, the charging roller No. 55 having a protective layer was produced. The charging roller No. 55 was subjected to Evaluation 1 to Evaluation 5. The result is shown in Table 12.

TABLE 12

| | Evaluation 1 | | | | | | |
|---|---|---|---|---|---|---|---|
| | Volume resistivity | | Environmental | | | Evaluation of image | |
| Example | N/N Environment | L/L Environment | fluctuation digit of volume resistivity | Evaluation 2 | Evaluation 3 | Evaluation 4 (kV) | Evaluation 5 (%) |
| 54 | 3.3E+06 | 3.2E+07 | 0.98 | A | A | 1.51 | 98 |
| 55 | 8.8E+06 | 2.1E+07 | 0.38 | A | A | 1.38 | 98 |

Comparative Example 1

A coating solution No. 43 was prepared in the same manner as in (1-2) of Preparation Example 1 except that glycidyltrimethylammonium chloride was used as the ion conductive agent.

A charging roller No. C-1 was produced in the same manner as in Example 1 except that the coating solution No. 43 was used for formation of the surface layer, and subjected to Evaluations 1 to 5. The result is shown in Table 13.

Comparative Example 2

A coating solution No. 44 was prepared in the same manner as in (1-2) of Preparation Example 1 except that trimethylhexylammonium-bis(trifluoromethanesulfonyl)imide was used as the ion conductive agent.

A charging roller No. C-2 was produced in the same manner as in Example 1 except that the coating solution No. 44 was used for formation of the surface layer, and subjected to Evaluations 1 to 5. The result is shown in Table 13.

The ion conductive agent according to the present Comparative Example has no reactive functional group. For this reason, the binder resin according to the present Comparative Example has no quaternary ammonium group or sulfonate group in the molecule structure, and is not the ion conductive resin according to the present invention.

Comparative Example 3

A coating solution No. 45 was prepared in the same manner as in (1-2) of Preparation Example 1 except that stearic acid-bis(trifluoromethanesulfonyl)imide was used as the ion conductive agent.

A charging roller No. C-3 was produced in the same manner as in Example 1 except that the coating solution No. 45 was used for formation of the surface layer, and subjected to Evaluations 1 to 5. The result is shown in Table 13.

The ion conductive agent used in the present Comparative Example has a carboxyl group as the ion exchange group. For this reason, the binder resin according to the present Comparative Example has no quaternary ammonium group or sulfonate group in the molecule structure, and is not the ion conductive resin according to the present invention.

TABLE 13

| | Evaluation 1 | | | | | | |
|---|---|---|---|---|---|---|---|
| | Volume resistivity ($\Omega \cdot cm$) | | Environmental | | | Evaluation of image | |
| Comparative Example | N/N Environment | L/L Environment | fluctuation digit of volume resistivity | Evaluation 2 | Evaluation 3 | Evaluation 4 (kV) | Evaluation 5 (%) |
| 1 | 3.3E+06 | 2.5E+07 | 0.89 | A | A | 1.75 | 0 |
| 2 | 5.3E+06 | 3.1E+07 | 1.37 | C | D | 1.62 | 98 |
| 3 | 1.0E+09 | 8.4E+09 | 0.90 | A | D | Cannot be evaluated | 97 |

With respect to Evaluation 5, the carrier molecule contained in the electrically conductive layer of the charging roller No. C-1 according to the present Comparative Example was only chlorine ion. The chlorine ion is not the carrier molecule according to the present invention. For this reason, the result of Evaluation 5 was 0 mol %.

Example 56

A developing roller No. 1 was produced in the same manner as in Example 1 except that the elastic roller No. 3 was used, and the coating solution No. 4 was used for formation of the surface layer.

The developing roller No. 1 was subjected to Evaluation 1, Evaluation 2, Evaluation 5, and Evaluation 6 below.

<Evaluation 6; Electrophotographic Image Forming Test>
As an electrophotographic apparatus, a laser printer (Trade name: LBP5400, made by Canon Inc.) was used. The pressure at which the developing roller contacted with the photosensitive member and the amount of the developing roller to invade the photosensitive member were adjusted such that the amount of the toner to be applied onto the developing roller was 0.35 mg/cm². Moreover, a toner feeding roller made of a soft urethane sponge was provided, the toner feeding roller scraping the old toner from the developing roller and feeding a new toner to the developing roller.

The developing roller No. 1 was mounted on the laser printer as the developing roller, and 20000 sheets of an electrophotographic image were continuously formed, the image being such that horizontal lines were drawn at a width of 2 dots in the direction perpendicular to the rotational direction of the photosensitive member and an interval of 50 dots. Subsequently, one sheet of a halftone image was formed. The halftone image was visually observed, and evaluated according to the criteria shown in Table 14 below. The result is shown in Table 15.

TABLE 14

| Rank | Criteria for evaluation |
|---|---|
| A | No change in the density of the image synchronized with the rotation cycle of the developing roller is found. |
| D | Clear change in the density synchronized with the rotation cycle of the developing roller is found. |

Examples 57 to 59

Developing rollers Nos. 2 to 4 were produced in the same manner as in Example 56 except that coating solutions having a number shown in Table 15 were used for formation of the surface layer, and subjected to Evaluations 1, 2, 5, and 6. The results are also shown in Table 15.

TABLE 15

| | | Evaluation 1 | | | | | |
|---|---|---|---|---|---|---|---|
| | | Volume resistivity | | Environmental | | | |
| Example | Coating solution No. | N/N Environment | L/L Environment | fluctuation digit of volume resistivity | Evaluation 2 | Evaluation 5 (%) | Evaluation 6 |
| 56 | 4 | 1.4E+07 | 3.5E+07 | 0.39 | A | 99 | A |
| 57 | 10 | 2.0E+07 | 3.9E+07 | 0.29 | A | 99 | A |
| 58 | 14 | 1.9E+07 | 4.4E+07 | 0.36 | A | 92 | A |
| 59 | 25 | 2.6E+07 | 6.1E+07 | 0.37 | A | 99 | A |

Comparative Example 4

A developing roller C-4 was produced in the same manner as in Example 56 except that the coating solution No. 4 was replaced by the coating solution No. 44 to form the surface layer, and subjected to Evaluations 1, 2, 5, and 6. The result is shown in Table 16.

The ion conductive agent according to the present Comparative Example has no reactive functional group. For this reason, the binder resin according to the present Comparative Example has no quaternary ammonium group or sulfonate group in the molecule structure, and is not the ion conductive resin according to the present invention.

TABLE 16

| | Evaluation 1 | | | | | |
|---|---|---|---|---|---|---|
| | Volume resistivity ($\Omega \cdot cm$) | | Environmental fluctuation digit | | | |
| Comparative Example | N/N Environment | L/L Environment | of volume resistivity | Evaluation 2 | Evaluation 5 (%) | Evaluation 6 |
| 4 | 1.5E+07 | 4.0E+07 | 0.42 | C | 99 | D |

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2011-062717, filed Mar. 22, 2011, and Japanese Patent Application No. 2012-051718, filed Mar. 8, 2012 which are hereby incorporated by reference herein in their entirety.

REFERENCE SIGNS LIST

11 Core metal
12 Elastic layer
13 Surface layer
14 Intermediate layer

What is claimed is:

1. An electrophotographic electrically conductive member comprising an electrically conductive support and an electrically conductive layer, wherein
the electrically conductive layer comprises
an ion conductive resin having a quaternary ammonium ion in a molecule structure as a binder resin, and
a carrier molecule represented by a following formula (1):

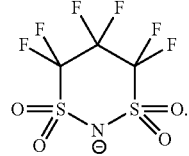

(1)

2. The electrically conductive member according to claim 1, wherein the molecule structure of the ion conductive resin has an ethylene oxide unit.

3. The electrically conductive member according to claim 2, wherein the ion conductive resin is a phenol resin.

4. An electrophotographic apparatus comprising an electrically conductive member according to claim 1.

5. A process cartridge comprising an electrically conductive member according to claim 1, the process cartridge being detachably attached to a main body of an electrophotographic apparatus.

* * * * *